H. J. WIEGAND.
DRUM CONTROLLER.
APPLICATION FILED MAR. 14, 1907.

904,906.

Patented Nov. 24, 1908.
7 SHEETS—SHEET 1.

Fig. 1.

Witnesses:
L. V. Domanus
H. Terry Hahn

Inventor:
Henry J. Wiegand,
By Edwin B. H. Tower Jr.
Atty.

H. J. WIEGAND.
DRUM CONTROLLER.
APPLICATION FILED MAR. 14, 1907.

904,906.

Patented Nov. 24, 1908.
7 SHEETS—SHEET 5.

Witnesses:
L. V. Domarus.
M. Perry Hahn

Inventor:
Henry J. Wiegand
By Edw. B. Thrower Jr.
Atty.

H. J. WIEGAND.
DRUM CONTROLLER.
APPLICATION FILED MAR. 14, 1907.

No. 904,906.

Patented Nov. 24, 1908.
7 SHEETS—SHEET 6.

Witnesses:
L. V. Domarus.
W. Perry Hahn

Inventor:
Henry J. Wiegand
By: Edwin B. H. Tower
Atty.

UNITED STATES PATENT OFFICE.

HENRY J. WIEGAND, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

DRUM-CONTROLLER.

No. 904,906.  Specification of Letters Patent.  Patented Nov. 24, 1908.

Application filed March 14, 1907. Serial No. 362,368.

*To all whom it may concern:*

Be it known that I, HENRY J. WIEGAND, a citizen of the United States, residing at Milwaukee, in the county of Milwaukee and State of Wisconsin, have invented new and useful Improvements in Drum-Controllers, of which the following is a full, clear, concise, and exact description, reference being had to the accompanying drawings, forming a part of this specification.

My invention relates to improvements in electrical switches and is particularly applicable to motor controllers.

One of the objects of my invention is to provide a controller in which means are provided for mechanically operating a series of switches in a definite sequence.

The controller which my invention provides is especially adapted for use in circuits carrying heavy currents.

In order to explain the nature of my invention, I shall describe one form thereof which is illustrated in the accompanying drawings. The figures in the drawings are as follows.

In the embodiment of my invention illustrated in the accompanying drawings, I provide for inclosing the various parts of the controller, a casing, which is preferably made in two parts only, the back, top and bottom forming one part, and the front and sides forming the second part. These two sections coincide to form an inclosing casing which completely protects the various parts of the controller.

Vertically mounted within the casing in suitable bearings 2 and 3 is a shaft 4 which carries the operating drum 5 of the controller. The drum is preferably supported on the shaft by means of upper and lower brackets 7 secured upon the shaft by collars 8 and pins 9 which extend through the collars and the shaft. The arms 10 of the brackets are secured to the drum by bolts 11 which pass through said arms and flanges 12 formed on the ends of the drum. Suitable insulating disks 13 are interposed between the brackets and the ends of the drum, as well as insulating disks 14 between the bolts and the brackets, to properly insulate the drum from the shaft and other parts of the controller.

The drum 5 has formed thereon at suitable intervals operating cams which are arranged to actuate various switches of the controller, to be hereinafter more fully described. These cams are illustrated as being formed integrally with the drum but it will be understood that they may be secured upon the drum in any desired manner or that any other suitable actuating means may be used in place of the cams. The cams 16, 17, 18, and 19 at the upper end of the drum are longer than the other cams, and are arranged to operate the reversing switches of the controller. The remaining cams 20 are arranged to properly operate the resistance controlling switches of the controller.

The drum may be rotated in any desired manner but for the purpose of illustration, I have shown the same as being manually rotated by a handle 21 mounted on the shaft 4. The handle is provided with a mechanism for locking it in the "off" position, consisting of a push button 22 and a pivoted spring pressed pawl 23 one end of which is arranged to engage between a pair of stops 24 formed on the top of the casing. A stop mechanism for holding the drum in any position to which it may be rotated is provided and comprises a star wheel 25 mounted on the shaft 4 and a spring controlled lever 25 having at its engaging end a roller 26 which engages the star wheel.

The switches 27 of the controller operated by the cams on the drum are arranged upon either side of the drum and are mounted upon bases 28 secured by means of suitable bolts to supporting arms 29 extending forwardly from the back of the controller casing. These bases are preferably made of wood, but it will be understood that any other suitable material may be provided, and at their forward ends are provided with angle irons 30 which prevent the bases from splitting and protect the edges of the wood. The forward or free ends of the arms 29 are spaced apart and held against deflection by cross bars 31 secured thereto by nuts arranged upon each side of the arms.

As the various switches operated by the cams on the drum are of substantially the same construction, I will only describe in detail one of the same. Each of the switches 27 comprises an arm 32 pivotally mounted in a supporting bracket 33 secured to the base 28, and carrying at its outer end a roller 34 adapted to be engaged by the corresponding cam on the drum. The arm 32 carries a main contact 35, an auxiliary contact 36, and an arcing contact 37. The main contact 35 is flexible so that when it engages the stationary contact 38, also mounted upon the base 28, it will rub over the same. It is preferably made of laminations or leaves of copper which are secured in a cup 39 mounted upon the arm 32. The auxiliary contact 36 is preferably mounted upon one end of a flexible or spring arm 40 secured at its opposite end to the arm 32 and the arcing contact 37 is preferably pivoted upon one end of a spring arm 41, also having its opposite end secured to the arm 32.

The various contacts are electrically connected with a binding post upon the opposite side of the base by a curved metallic arm 42 which has one end secured to the cup 39 and the opposite end secured in position upon the base by the bolt 43 which extends through the base and forms at its opposite end a binding post. The arcing contact 37 is preferably connected to the arm 32 by a braided or flexible conductor 44 which carries the current instead of the spring arm 41 whereby the temper of the arm 41 will not be affected. The roller 34 on the end of the arm 32 is held against the face of the drum by a coiled spring 45 extending between the arm 32 and the arm 42.

The stationary contact 38 comprises a plate 46 secured upon the base and having at its outer end a carbon contact 47, secured in a socket formed in the plate, by a bolt or pin 48. One of the bolts which secures the plate 38 in position extends through the base to form a binding post 49 upon the opposite side thereof. The contact plate is protected by an inclosing casing 50 suitably lined with insulating material. In operation the contacts of the switch arm engage and disengage the contact plate in the order in which they have been named, that is, first the main contact, then the auxiliary contact, and finally the arcing contact. In addition to the reversing switches and the resistance controlling switches, I have provided a main line switch 51, which is also operated from the shaft 4. At the end of the shaft 4 upon a bracket 52 similar to the brackets 7 and 8 is mounted a disk 53 preferably formed of fiber or some suitable insulating material, and having a notch 54 formed in the periphery thereof.

Mounted upon a shaft 55 suitably supported in bearings 56 carried by a supporting block 57, is one arm 58 of a bell crank lever. A roller 59 carried at the outer end of the arm engages the disk 53. The other member 60 of the bell crank lever carries a main contact 61, an auxiliary contact 62, and an arcing contact 63. These contacts are constructed substantially as the contacts of the switches heretofore described, and it will, therefore, be unnecessary to more fully describe the same. They are connected with the binding post 64 by means of a suitable conductor 65 whereby they may be suitably connected in circuit. A coiled spring 66 interposed between the arm 58 of the bell crank lever and the supporting base 57 maintains the roller 59 in engagement with the disk 53 and the switch in the open position. The contact plate 67 is provided with an offset 68 by which it is secured to the base 57 and is of substantially the same construction as heretofore described.

A blowout magnet for extinguishing the arc between the carbon contact of the contact plate 67 and the arcing contact 63 is also mounted upon the base 57. It is preferably provided with pole pieces 68 which are attached to the base 57, and have arranged between the same a blowout coil 69, one terminal of which is connected with the main line binding post 70, by the conducting arm 71, while the other terminal thereof is connected with the contact plate 67. The pole pieces are provided with polar extensions 72 between which sets an insulating barrier or chute 73 in which is arranged the contact plate 67. The insulating barrier is preferably made of insulating plates or disks 74 which are attached to a block 75 by bolts 76 or any other securing means.

The various switches are arranged to be closed by the rotation of the drum in their proper sequence as follows: Upon moving the controller handle in a clockwise direction the main line switch is closed and one set of reversing switches are closed in such a manner that the circuit will pass through the motor to operate the same in a forward direction. A continued movement of the handle closes the resistance controlling switches in a definite sequence to cut the resistance out of the motor circuit section by section. A movement of the handle in a counter-clockwise direction will close the main line switch and the opposite set of reversing switches to reverse the direction of the current through the armature of the motor and cut the resistance out of the motor circuit section by section. This may be more fully understood by reference to Fig. 12, which shows a diagrammatic view of the circuit arrangement.

Figure 1:
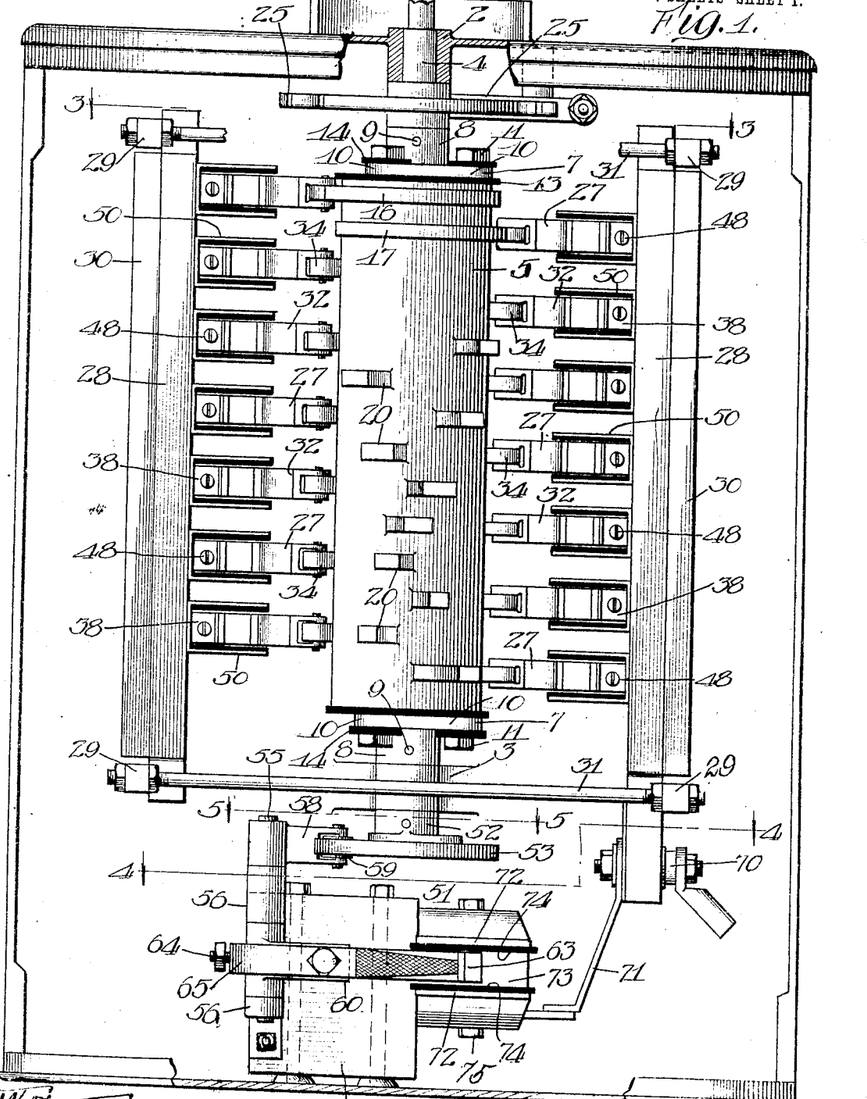
Figure 1 is a front elevation with the casing removed.
Figure 2:
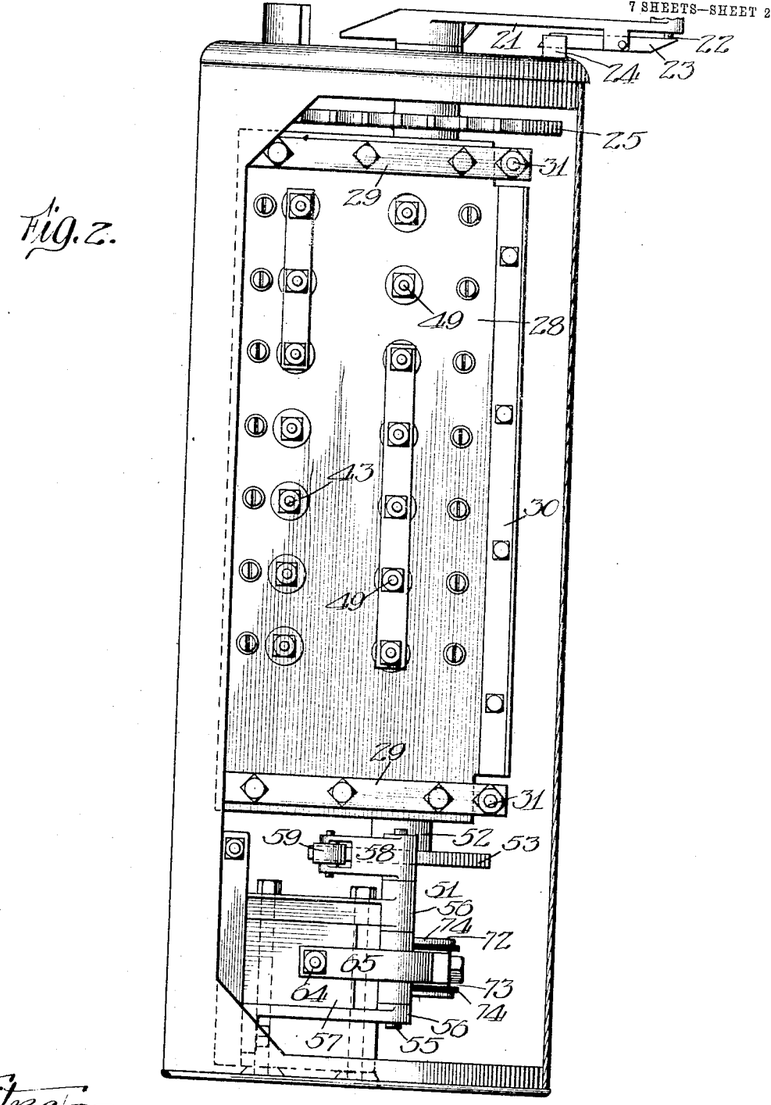
Fig. 2 is a side elevation showing casing in section.
Figures 3, 10:
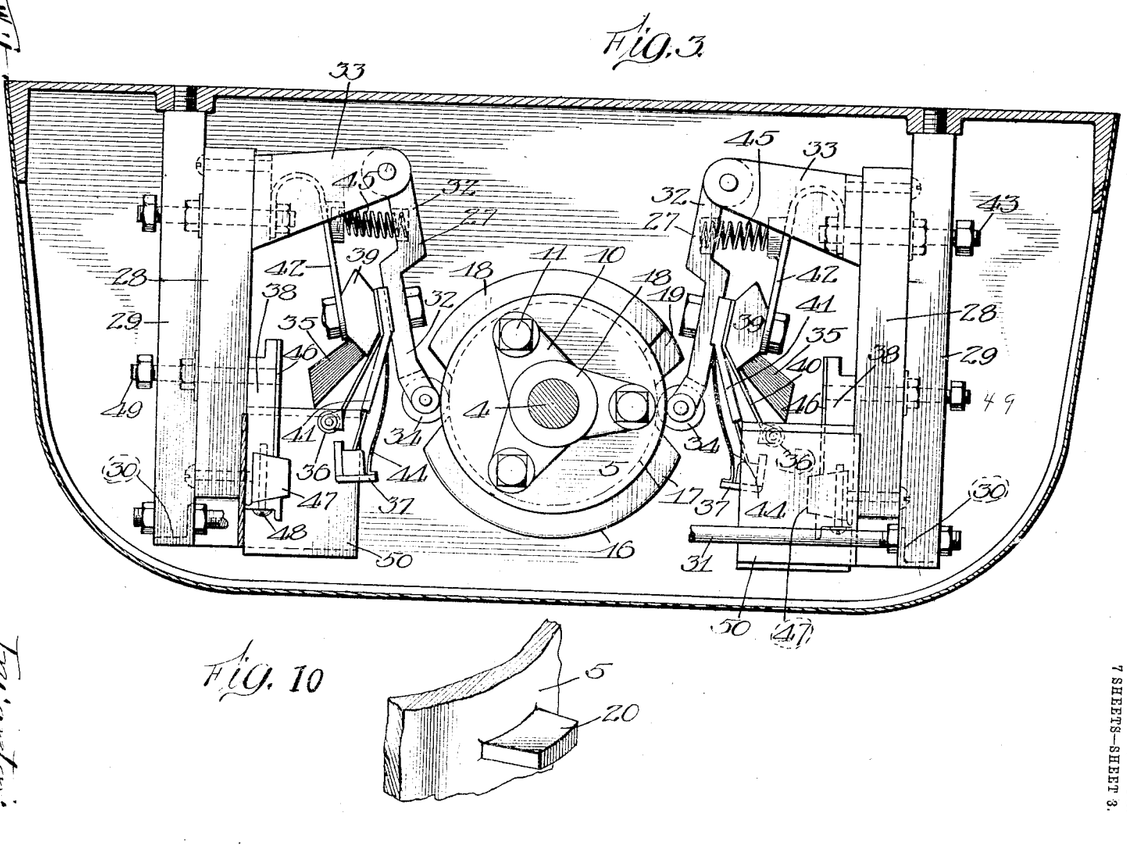
Fig. 3 is a section on the line 3—3 of Fig. 1.
Fig. 10 is a perspective detail of the drum.
Figure 4:
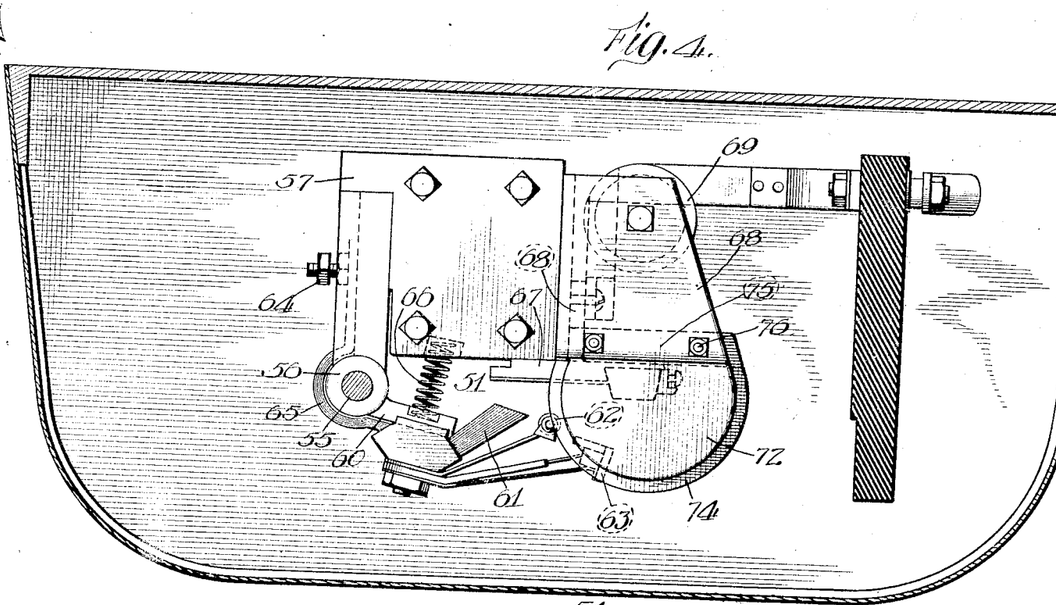
Fig. 4 is a section on line 4—4, Fig. 1.
Figure 5:
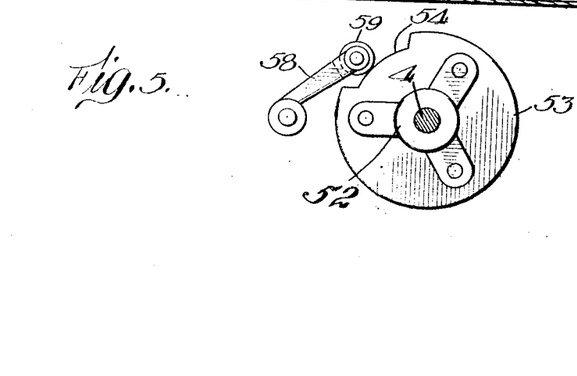
Fig. 5 is a section on line 5—5, Fig. 1.
Figure 6:
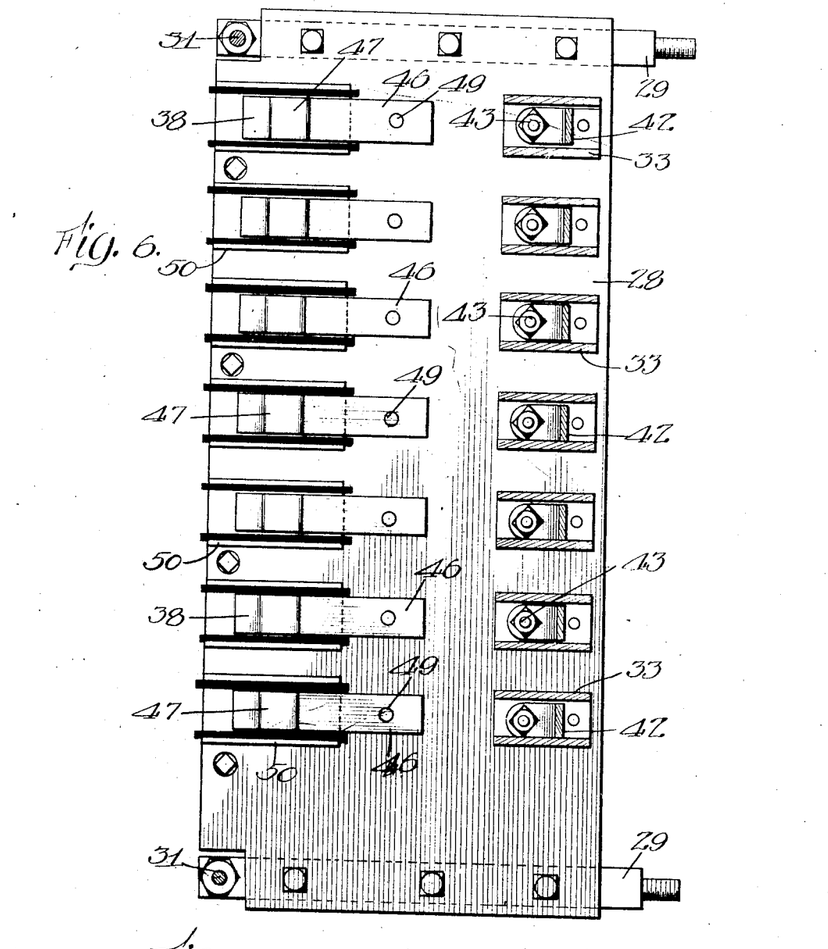
Fig. 6 is a side elevation of the contact part of the controller.
Figures 7, 8, 9:
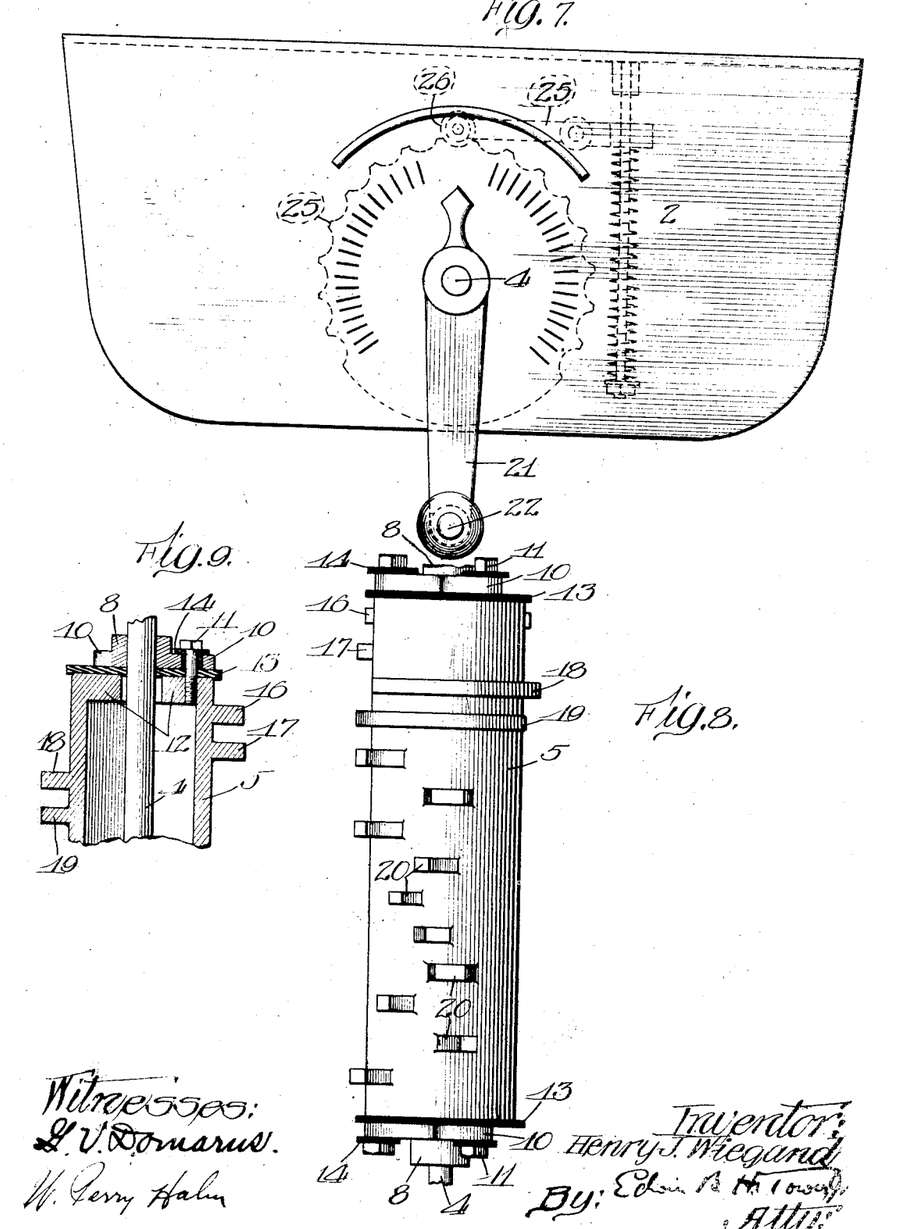
Fig. 7 is a plan view of my device.
Fig. 8 is an elevation showing the reverse side of the drum to that shown in Fig. 1.
Fig. 9 is a detailed section of the drum.
Figure 11:
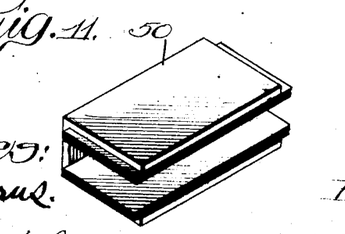
Fig. 11 is a perspective view of one of the protecting casings for the switch contacts.
Figure 12:
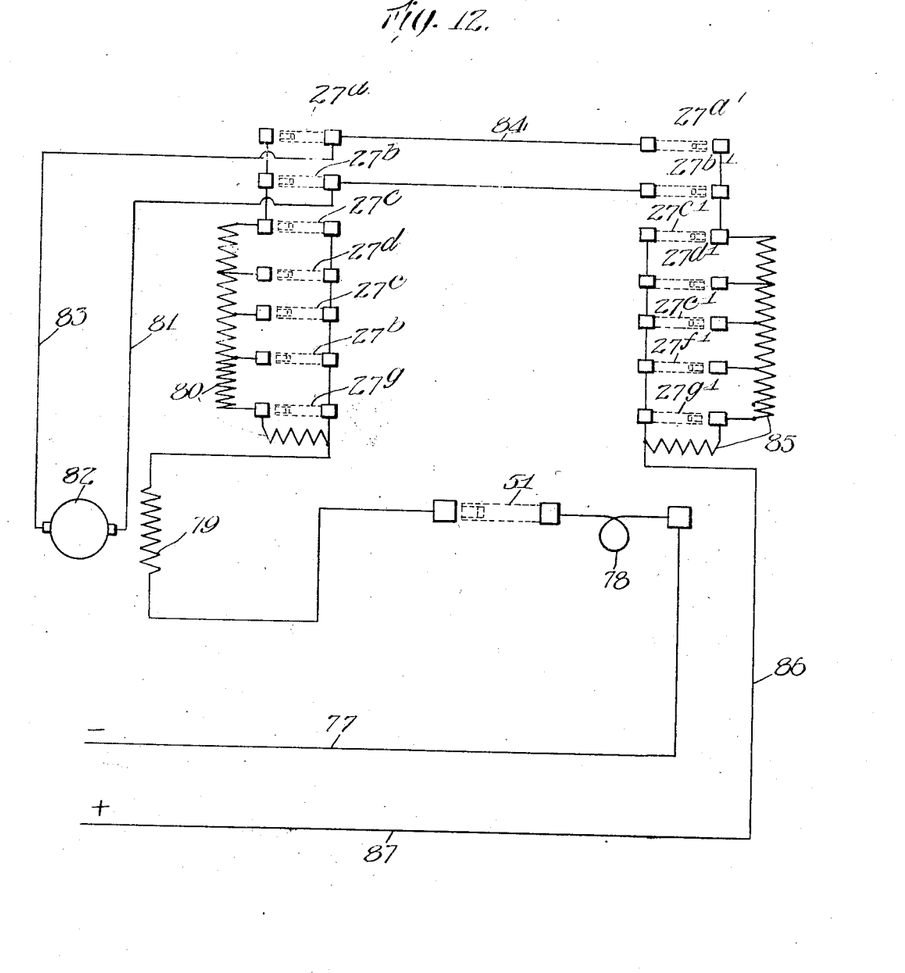
Fig. 12 is a diagrammatic view of the circuit arrangement of my controller.

In the diagrammatic view of the circuit arrangement shown in Fig. 12, the switches arranged on one side of the drum, in order that the operation of my invention may be more fully described, will be numbered 27$^a$, 27$^b$ for switches controlling the direction of operation of the motor, and 27$^c$, 27$^d$, 27$^e$, 27$^f$ and 27$^g$ for the resistance controlling switches. The switches upon the opposite side of the controller will be numbered 27$^{a\prime}$, 27$^{b\prime}$ for the switches controlling the direction of operation of the motor, and 27$^{c\prime}$ to 27$^{g\prime}$ for the resistance controlling switches.

In operation, assuming that the controller is in the "off" position, to start the motor, the handle of the controller is moved in a clockwise direction. This will cause the disk 53 to close the main line switch 51 and the cams 16 and 17 to close the reversing switches 27$^b$ and 27$^{a\prime}$. With these switches closed, the circuit will be as follows: from the main line 77, through the winding 78 of the blow-out magnet, across the main line switch 51, through the field winding 79 of the motor, through all of the resistance 80, across reversing switch 27$^b$ by conductor 81, through the armature 82 of the motor, by conductors 83 and 84 across reversing switch 27$^{a\prime}$, through all of the resistance 85, by conductor 86 back to the opposite side 87 of the main line. A continued movement of the handle will cause the cams on the drum to close switch 27$^g$ to cut out the first section of resistance, then switch 27$^{g\prime}$ to cut out another section of resistance, and so on until all of the resistance has been cut out of the motor circuit.

Assuming now that the controller is again in the "off" position, a counter clockwise movement of the controller handle will cause the cams 19 and 20 to close the reversing switches 27$^a$ and 27$^{b\prime}$, and at the same time, the disk 53 to close the main line switch 51. The circuit will now be closed through the motor in an opposite direction and the motor will run in a reverse direction. A continued movement of the controller handle in a counterclockwise direction will close the resistance controlling switches to cut out, as heretofore described, the various sections of resistance.

While I have shown and described a specific form of my invention, it will be understood that I do not intend to be limited to the structure so illustrated and described, but may make various modifications and changes therein without departing from the spirit of my invention, as set forth in the appended claims.

Having thus described my invention what I claim and desire to secure by Letters Patent of the United States is—

1. In a controller, the combination with a plurality of reversing switches, of a plurality of resistance switches, and a single rotatable member provided with cams for actuating said resistance switches and a part of said reversing switches when said member is rotated in either direction.

2. In a controller, the combination with a plurality of reversing switches, of a plurality of resistance switches, a main line switch, and a single movable member provided with means for actuating said resistance switches, said main line switch and certain of said reversing switches when said member is moved in either direction.

3. In a controller, the combination with a plurality of reversing switches, of a plurality of resistance switches, a main line switch, a rotatable shaft, a plurality of cams carried thereby for actuating said resistance switches, said main line switch and certain of said reversing switches when said shaft is moved in either direction, and a blow-out for said main line switch.

4. In a controller, the combination with a plurality of reversing switches, of oppositely disposed sets of resistance switches, a main line switch and a single movable member mounted between said sets of resistance switches and provided with cams for actuating all of said resistance switches, said main line switch and certain of said reversing switches when said member is moved in either direction.

5. In a drum controller, the combination with a pair of supporting bases, of a set of reversing contacts and a set of resistance contacts carried by each of said bases, a set of reversing switches and a set of resistance switches carried by each of said bases and adapted to coöperate with said contacts, a drum mounted between said bases and provided with a plurality of cams for actuating all of said resistance switches and certain of said reversing switches when said drum is moved in either direction.

6. In a drum controller, the combination with a pair of supporting bases, of a set of reversing contacts and a set of resistance contacts carried by each of said bases, a set of reversing switches and a set of resistance switches carried by each of said bases and adapted to coöperate with said contacts, a shaft rotatably mounted between said bases, a drum mounted on said shaft and insulated therefrom, said drum being provided with a plurality of cams for actuating all of said resistance switches and certain of said reversing switches when moved in either direction, a main line switch, and a cam carried by said shaft for operating said main line switch when moved in either direction.

7. In a controller, the combination with a series of oppositely disposed switches for controlling the direction of operation of the motor, of a series of oppositely disposed resistance controlling switches, a main line switch, and a rotatable member having actuating means for operating said switches in a definite sequence.

8. The combination with a casing of supporting bases arranged therein, a plurality of switches mounted upon said bases, a main line switch arranged within said casing, a member rotatably mounted within said casing between said bases having actuating means for operating said first mentioned switches and actuating means for operating said main line switch.

9. In a controller, the combination with switches for controlling the direction of operation of the motor of resistance switches, a main line switch, of a rotatable member having actuating means for operating said switches in definite sequence, and a blowout magnet for said main line switch.

In witness whereof, I have hereunto subscribed my name in the presence of two witnesses.

HENRY J. WIEGAND.

Witnesses:
W. M. HELZ,
T. E. BARNUM.